United States Patent [19]
Lang et al.

[11] Patent Number: 5,009,110
[45] Date of Patent: Apr. 23, 1991

[54] TORQUE SENSOR, IN PARTICULAR FOR ELECTRIC STEERING MECHANISM

[75] Inventors: Armin Lang, Schwäbisch Gmünd; Bernhard Schweizer, Böbingen/Rems, both of Fed. Rep. of Germany

[73] Assignee: Zahnradfabrik Friedrichshafen, AG., Friedrichshafen, Fed. Rep. of Germany

[21] Appl. No.: 381,406
[22] PCT Filed: Jan. 29, 1988
[86] PCT No.: PCT/EP88/00063
§ 371 Date: Jul. 12, 1989
§ 102(e) Date: Jul. 12, 1989
[87] PCT Pub. No.: WO88/05742
PCT Pub. Date: Aug. 11, 1988

[30] Foreign Application Priority Data
Feb. 3, 1987 [DE] Fed. Rep. of Germany ....... 3703102

[51] Int. Cl.⁵ .............................................. G01L 3/10
[52] U.S. Cl. .................................................. 73/862.33
[58] Field of Search ............ 73/862.33, 862.34, 862.35

[56] References Cited
U.S. PATENT DOCUMENTS
2,432,900 12/1947 Jacobsen .......................... 73/862.33

Primary Examiner—Donald O. Woodiel
Attorney, Agent, or Firm—Albert M. Zalkind

[57] ABSTRACT

A torque sensor for measuring the torque being transmitted by a torque bar comprises a pair of coaxial input elements carried on a torque bar and secured thereto, and being connected by a lost motion coupling. Each such input element has flexible spokes fixed to respective sides of an output collar. Steering torque stress applied to the torque bar in either direction effects rotation of a respective input element depending on direction of rotation. Thus, such directional rotation causes flexing of the flexible spokes between an input element and the output collar. Linear longitudinal movement of the output collar is thus caused in a direction depending on the direction of rotation of a respective input element. The direction and degree of movement of the output collar serves to vary a magnetic field to which an electrical measuring circuit is responsive for torque measurement. Two torque sensors can be connected in series with respect to the same torque bar to achieve various measurement effects.

27 Claims, 3 Drawing Sheets

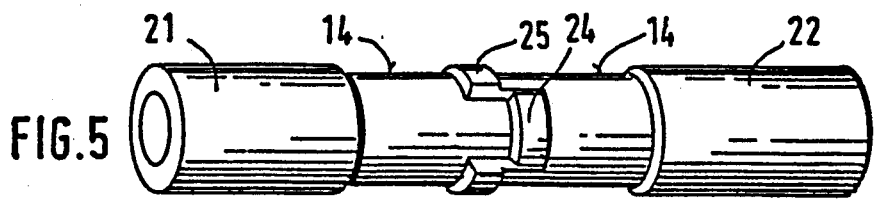
FIG.5
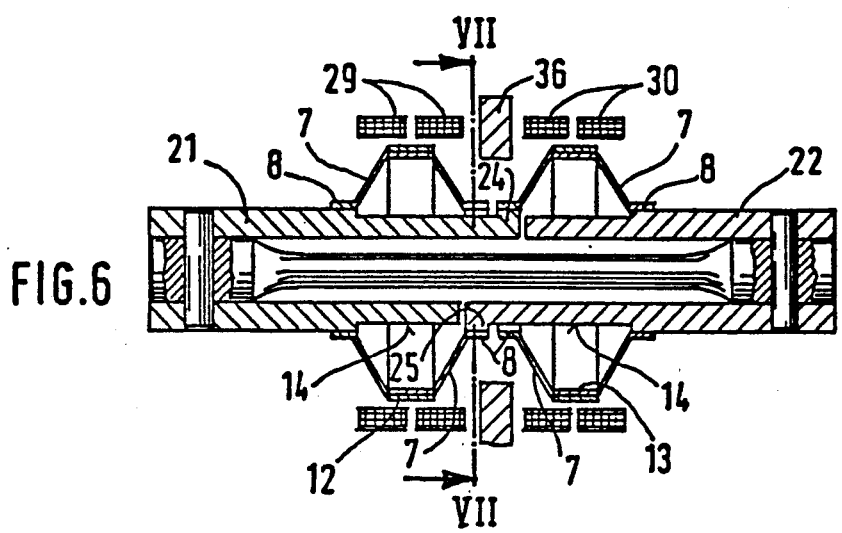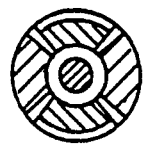
FIG.6  FIG.7
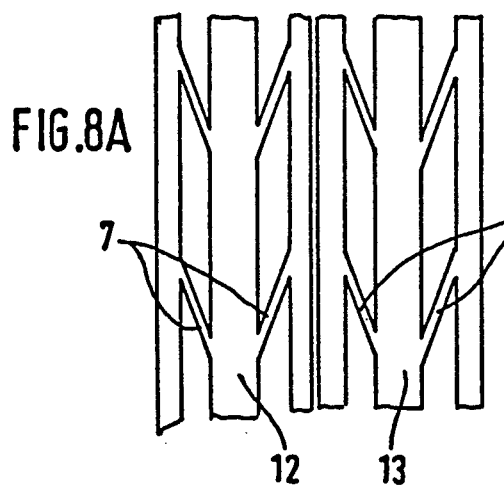
FIG.8A
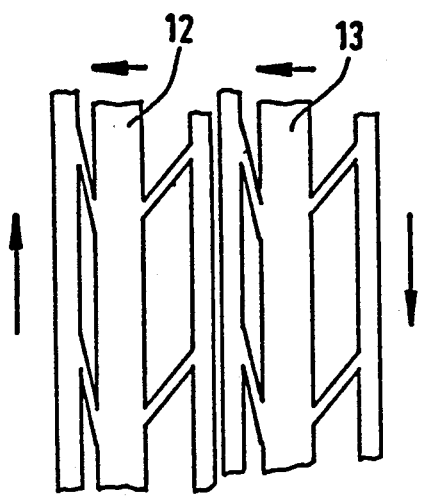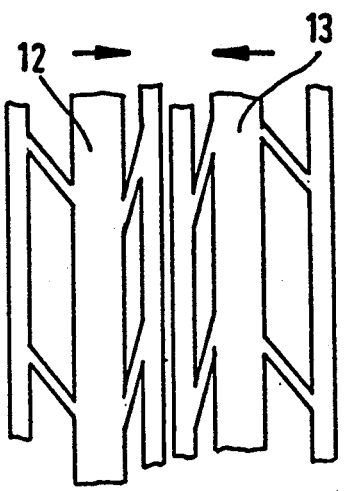
FIG.8B  FIG.8C

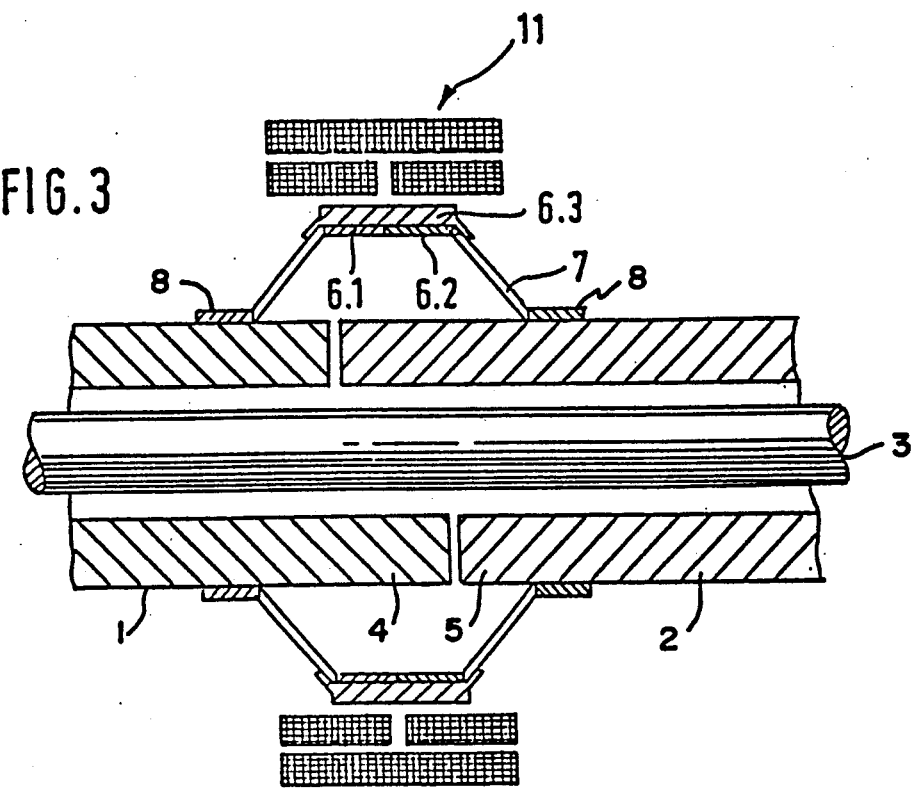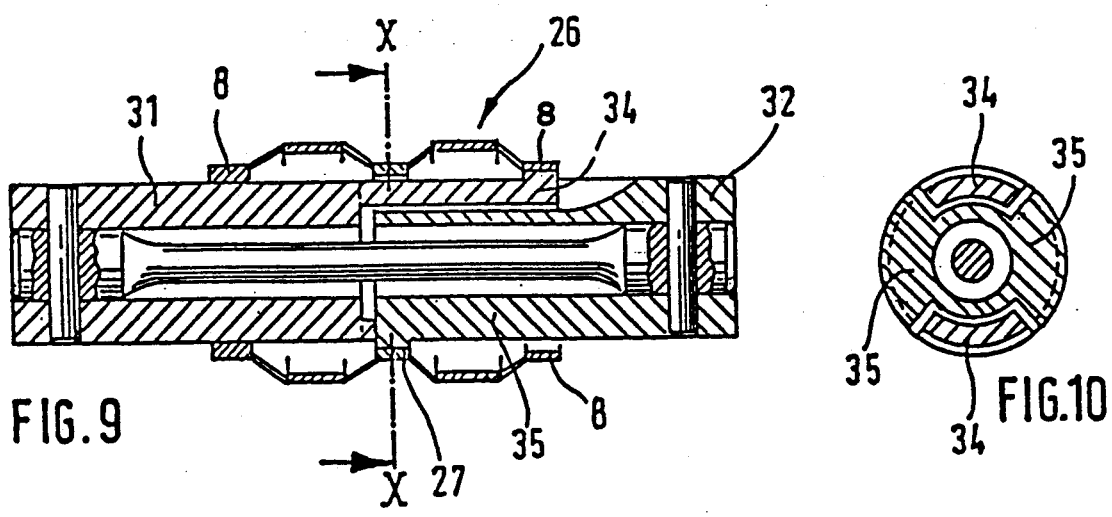

TORQUE SENSOR, IN PARTICULAR FOR ELECTRIC STEERING MECHANISM

BACKGROUND OF THE INVENTION

The invention is concerned with a torque sensor, in particular for electric steering mechanisms.

Such torque sensor is known from Norton, U.S. Pat. No. 4,548,091. This patent has an inductively operating torque sensor with two input elements and an annular output element connected to the input elements by a series of connecting elements and reinforcing arms with articulated connections. The construction is very expensive and has a relatively big outside diameter which results from the installation of a large number of complicated individual parts. Constructing a series of torque sensors out of such elements is not possible since so doing would cut the sensor's twisting rigidity in half.

The object of the invention is to avoid the disadvantages inherent in Norton and to provide a torque sensor of small size and ease of manufacture. A series of sensors should be possible without affecting the torsional characteristics.

A technical article of "Machine Design" of Apr. 14, 1966 (V903) shows a sleeve of magnetically permeable material having ring flanges at its ends secured to a torque bar. The sleeve has a central ring flange in between the end ring flanges on each side.

There is an arrangement of bores connected by slots slanted at 45° in the sleeve between each ring and the center ring.

The slots at one side of the center ring are slanted oppositely from that on the other side to result in a relative 90° angular relationship.

SUMMARY OF THE INVENTION

By means of the flexible elements, e.g., spokes, between the input elements on respective sides of the output element, the individual coacting elements of the torque sensor can be manufactured easily. The spokes coact directly from the input elements to the output element to shift it axially. The spoke array of the torque sensor is variably conical as later described.

The input means carry respective collars, and encompass a torque bar to which they are secured. There is a lost motion coupling wherein the rotative mechanism is safe against overloading in the event of steering power failure with resort to manual steering.

The invention permits a construction of torque sensors in series without increase in torsion rigidity.

When two output means are used, different directions of movement of the output means results from different arrangement of the spokes where their angular position is concerned. The movement of the output means can take place in the same direction or in opposite directions as a result of that, so that favorable measured variables, depending upon the application that is to be made, result for the electrical utlization of the torque signals.

When the output means has two cylindrical rings or collars, each having spokes for support on an input means, the individual parts are very easy to manufacture by presses. The individual parts can be connected with each other easily by laser beam welding or components made as an integral piece.

The invention is described in greater detail in the drawing wherein like reference numbers are generally used for similar parts.

FIG. 3 shows a longitudinal section as in FIG. 2, of a second embodiment and is a preferred embodiment.

FIG. 5 shows a perspective view of the input elements of a torque sensor of a third embodiment.

FIG. 6 shows a longitudinal section through the entire torque sensor of the third embodiment.

FIG. 7 shows a cross section through the torque sensor along the line VII—VII in FIG. 6.

FIGS. 8A, 8B, 8C show developed plan views of the two output elements of the torque sensor shown in FIG. 6 in two different operating positions and neutral.

FIG. 9 shows a longitudinal section through a torque sensor of a fourth embodiment.

FIG. 10 shows the cross section through the torque sensor along the line X—X in FIG. 9.

Figure 1:
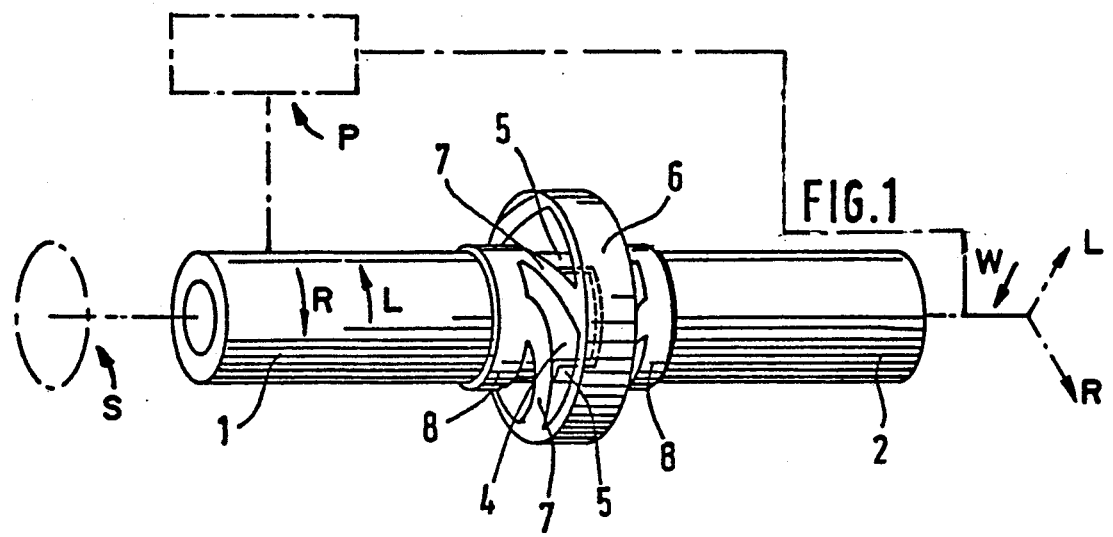
FIG. 1 shows a perspective view of the torque sensor in a first embodiment.
Figure 2:
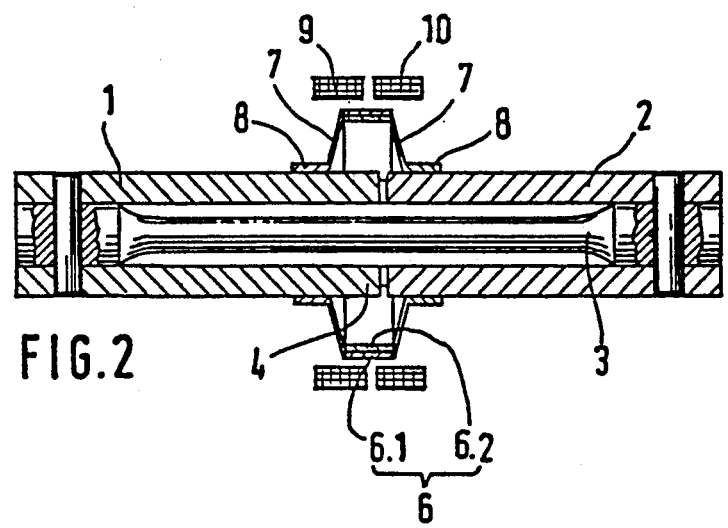
FIG. 2 shows a longitudinal section through the torque sensor of FIG. 1.

The torque sensor in the embodiment shown in FIG. 1 and 2 show input means 1, 2 having two sleeves or elements coaxial with each other, and having outer ends fastened to a torque bar 3. At their opposed ends the input elements 1 and 2 have respective castellated ends 4 and 5 (also see FIG. 5) with spaced fingers viz., a lost motion coupling between the input elements 1 and 2 to guard against torque overload should manual steering force and excess twist be applied to the torque in event of power steering failure.

An output means, essentially a cylindrical composite output element or collar 6 in this instance is held at a radical distance by flexible means from the input elements 1 and 2 by a radial array of flexible spokes 7 on respective sides of output means 6 or elements. The spokes are circumferentially slanted at an opposed angular relationship on each side. Such angle may be 90° as known from the "Machine Design" article hereinabove described.

The inner ends of spokes 7 are secured to respective collars 8 secured in turn to respective input elements 1 and 2.

Figures 4A, 4B, 4C:
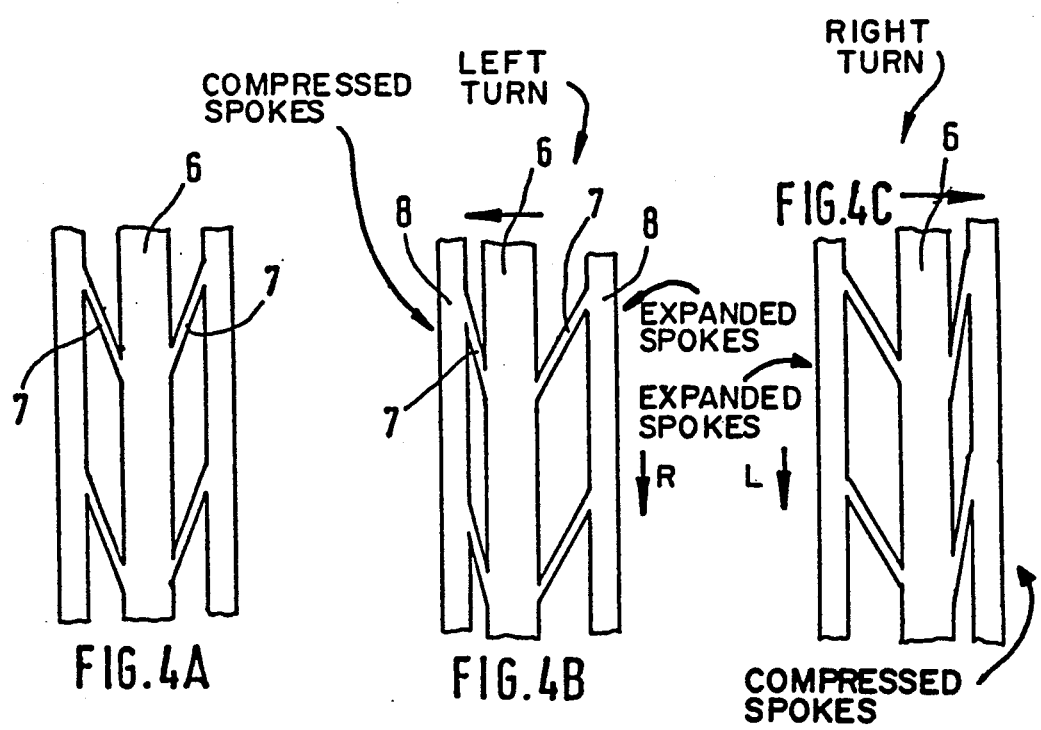
FIGS. 4A, 4B, 4C show developed plan views of the elements in two different operating positions and neutral.

The spokes 7 have slight conicity with the cone angle falling between approximately 150° and 178°. As seen spokes 7 have an arcuate shape as formed from a conical surface, which may be curved in the shape of the arc of a circle or bent in a similar curve. Spokes 7 enclose equal angles with the output element 6 (as best seen in FIGS. 4A, 4B and 4C to be later discussed).

As seen in FIG. 2 it is advantageous for the output element 6 to consist of two collars or rings such as 6.1 and 6.2 radially contiguous and fastened together to form in effect a composite output element 6. A laser ray welding process may be used for fastening when the torque sensor is metal.

A set of spokes 7 is secured to a respective input element 1 and 2 as shown, the spokes being secured to a respective collar 8 at their inner ends and to respective output collars 6.1, 6.2 at their outer ends.

An entire metal assembly of input sleeves 1 and 2, collars 8 and output collars 6.1, 6.2 may be assembled by laser ray welding.

It is possible by the nature of the connection of an output element 6 and a set of spokes 7 connected with a collar 8 to manufacture this component easily in metal. For example, a method wherein cups are formed—of diameters desired for collar 6.1 and 6.2. When this is done, the larger cylindrical outer wall of a cup forms the ring 6.1 or 6.2. Each collar 8 comes into being from a smaller cylindrical wall drawn from the cup bottom. The spokes 7 are punched out in the desired shapes from the flange radially between the spaced concentric walls, i.e, from what had been left of the cup bottom.

This forming process can also include forming the conicity as well as the arcuateness of each spoke.

Thus each half of the composite elements of spokes 7, collar 6.1 or 6.2 and a collar 8 is formed from a single sheet. A BeCu alloy has proved to be desirable as a material for the components thus formed in metal.

In FIG. 3, plastic is used for the elements consisting of coplanar output collars 6.1 and 6.2, the spokes 7 and the collars 8. The two collars 6.1 and 6.2 have the same outside diameter secured by a ferritic ring 6.3 of iron or equivalent.

In the construction described the cone angle can be reduced to approximately 90°.

Aside from the materials that have been mentioned, it is also possible to manufacture the spokes 7 of wire and connect them with the rings 6.1 and 6.2 and collars 8.

As shown in FIG. 2, two inductive coils 9 and 10 or a differential transformer 11, FIG. 3, consisting of three coils, are associated with the output element 6. Such coils are powered by a carrier-frequency bridge and used in suitable rectifier circuit (not shown).

In the embodiment shown in FIGS. 5 to 8A, 8B, 8C two output elements 12 and 13 are disposed coaxially in series.

As seen in FIG. 6, two coaxial input element such as sleeves or collars 21 and 22 have respective enlarged inner ends 24 and 25 castellated, FIG. 7, as a lost motion coupling to protect against manual torque overload if the steering power fails.

For the magnetic isolation of the flux of solenoids 29 and 30 (FIG. 6) or the solenoids of a differential transformer, it is desirable to install a baffle 36 of ferritic material between them to block interacting flux of the solenoids.

Thus, each sleeve has a portion 14 of a diameter reduced from the diameters of the respective input sleeves 21 and 22. The castellated end 25 is shown rotated by 90° into the plane of the drawing in FIG. 7.

In FIG. 6, the left-hand spokes 7 of the left-hand output element 12 are fastened to the left-hand input element 21 via a collar 8. The right-hand spokes 7 of the left-hand output element 12 are fastened via a collar 8 to the castellated end 25 of the right-hand input element 22. Correspondingly, the left-hand spokes 7 of the right-hand output element 13 are fastened to the castellated end 24 of the left-hand input element 21 via a collar 8. The right-hand spokes 7 of the right-hand output element 13 are fastened to the right-hand input element 22 via a collar 8.

Suitable solenoids 29 and 30 (or a differential transformer) are proximate each output element 12 and 13.

In the embodiment of FIGS. 9 and 10, the two output elements 6.1 and 6.2 have equal diameters, and are coaxially connected to form an integral component output element 26. This is accomplished by uniting them with an input collar 27.

The input collars 31 and 32 are diametrically enlarged at their respective castellated ends 34 and 35 and are lengthened and telescoped one within the other, as shown. Castellated end 35 is shown rotated 90° into the plane of the drawing in FIG. 10.

The left-hand collar 8 is fastened to the left-hand input element 31 and the right-hand collar 8 is fastened to the castellated end 34 of that input element, as shown. A common central collar 27 is fastened to the castellated end 35 of the right-hand input element 32.

The output means which comprises collars 6, 6.1, 6.2, 12 and 13, can be either of magnetizable material such as iron, or of electrically conductive, nonmagnetizable material such as aluminum or copper, for example, or else of a combination of these materials. With magnetizable material, the coil gets a higher inductivity and with nonmagnetizable material it gets lower inductivity. Depending upon the wiring of the coils, advantages result from the choice of one material or another and of combinations of materials. When magnetized material is used, the collar is slotted.

In the following, the functioning of the torque sensor is described in greater detail.

FIG. 1 shows phantom lines labeled S, P, and W, respectively, for the steering wheel at the left end of torque bar 3, a steering power control system, and the steering linkage to the wheels at the opposite, i.e., right end of the torque bar 3. Fail-safe manual force steering in event of failure of the power system is transmitted by way of the lost motion coupling 4, 5, (24, 25, FIG. 6) through the torque bar to the vehicle wheels.

The arrows labeled L and R (left and right) for steering wheel S input determine steering directions and the vehicle wheel linkage W output for corresponding steering directions. In particular, the L and R arrows on FIGS. 4B and 4C have been made directionally consistent with those arrows for the steering wheel S rotation end of the torque bar. This is because a respective input collar 8 must be rotated in a selected steering direction in order to achieve expansion, i.e., conical angle increase of spokes 7 in FIG. 4B for right hand steering, or for left hand steering, FIG. 4C.

The expansion of a spoke cone shifts the output element 6 one way or the other as indicated by the associated arrows for effecting torque measurement in conjunction with pickup coils 9 and 10, as known.

In FIG. 1, the spoke array is not visible for the collar 8 on the right, but visible spokes for the collar 8 on the left are shown as at an angle of about 45 degrees radiating from the collar 8 on the left. It is understood that the unseen spokes are at about 45 degrees in the opposite direction. Accordingly, rotation of the steering wheel clockwise or counterclockwise directions as depicted in FIGS. 4B and 4C, respectively, causes respective spoke bending and cone expansion to shift the control element 6 in a respective arrow direction to effect torque measurements.

As depicted in FIGS. 4B and 4C, explansion of the spoke cone on one side is accompanied by spoke cone compression, i.e., decreasing the cone angle, on the other, i.e., the unseen side of FIG. 1, all dependent on whether the steering wheel is rotated for a right or left turn.

As a practical matter the torque measurement will be greater when the vehicle is parked, before it starts moving, because of the large ground resistance to steering of wheels which are not rolling. As the vehicle picks up speed the ground resistance of rolling wheels diminishes. This is generally compensated in power steering systems by a simulated steering resistance so that the driver has a "feel" for steering resistance. Otherwise, at high speeds, little or no driver steering effort can be very dangerous.

We claim:

1. A torque sensor particularly for electric steering mechanisms and which has a torque bar (3) with input means (1, 2) (21, 22) (31, 32) secured thereon; output means (6, 6.1, 6.2) (12, 13) (26); connecting means connecting each said input means to said output means and comprising a respective array of flexible elements secured to respective input means and the output means; the improvement comprising:

a lost motion connection between said input means; said flexible elements comprising a conical array of plastic spokes (7) carrying said output means; wherein spokes (7) on one side of respective the input means are circumferentially slanted in an opposite direction to the spokes on the other side whereby relative bi-directional rotation between said input means effects a respective axial opposite movement of said output means; and means responsive to said movement of said output means to effect torque measurement.

2. A torque sensor as set forth in claim 1, wherein said lost motion connection comprises opposed castellated ends (4, 5) (24, 25) (34, 35) of said input elements interdigitated and dimensioned to effect a lost motion coupling.

3. A torque sensor as set forth in claim 2 wherein said output means comprises a respective output collar (6.1, 6.2); said output collars being coplanor and carried by said spokes 7; said output rings carrying a ferritic ring (6.3) having movement to which said output means is responsive to effect torque measurement.

4. A torque sensor as set forth in claim 1, said output means (6) comprising radially nested collars (6.1, 6.2) carried by respective input means and integrally secured thereto by said flexible elements.

5. A torque sensor as set forth in claim 1, including a second torque sensor coaxially disposed in series with said first mentioned torque sensor; each said torque sensor having a respective output means and being secured to said torque bar by respective input means with a respective torque measuring means responsive to rotation thereof to effect torque measurement.

6. A torque sensor pair as set forth in claim 5, the output means of said torque sensors comprising a respective collar (12, 13) of differing radii and said collars being nested and secured together; including respective means (29, 30) responsive to shifting of an output collar for measuring torque stress responsive to shifting of the respective output collar, wherein an input means (21, 22) of each torque sensor is carried on a portion (24, 25) of the other input means.

7. A torque sensor set forth in claim 5, wherein respective output means comprises radially secured nested collars; and magnetic means (29, 30) responsive to movement of each output means, including a flux blocking baffle 36 isolating the magnetic fields of said magnetic means from each other.

8. In torque the sensors as set forth in claim 5, wherein two output means (26) are integral having output components axially spaced, an input means (31, 32) of each torque sensor having spokes connected to one side of an output means, and spokes connected to a common collar (27) of said input means having spokes connected to respective opposite sides.

9. In a torque sensor as set forth in claim 1, wherein the output means comprises a pair or radially nested collars (6.1, 6.2) secured to each other by laser-welding.

10. In a torque sensor as set forth in claim 1, wherein said input means comprises sleeves on (1a, 2a) said torque bar having interdigitated castellated ends dimensioned to mesh as a lost motion coupling.

11. In a torque sensor as set forth in claim 10, said input means further comprising collars (8) secured to said sleeves by laser-beam welding.

12. A torque sensor as set forth in claim 1, wherein said spokes are of polyamide.

13. A torque sensor as set forth in claim 1, wherein said spokes are of polyacetal.

14. A torque sensor as set forth in claim 1, wherein the output means comprises of magnetizable material.

15. A torque sensor as set forth in claim 1, wherein the output means comprises of slotted collar.

16. A torque sensor as set forth in claim 1, wherein the output means comprises a combination of electrically conductive, nonmagnetizable material.

17. A torque sensor as set forth in claim 1, wherein the output means is electrically conductive, non-magnetizable material.

18. A torque sensor particularly for electric steering mechanisms and which has a torque bar (3) with input means (1, 2) (21, 22) secured thereon; output means (6, 6.3, 12, 13); connecting means connecting each said input means to said output means and comprising a respective array of flexible elements secured to respective input means and the output means; the improvement comprising:

a lost motion connection (4, 5) (24, 25) between said input means; said flexible elements comprising a conical array of bendable spokes (7) carrying said output means; wherein spokes on one side of the input and output means are circumferentially slanted in an opposite direction to the spokes on the other side whereby relative bi-directional rotation between said input means effects a respective axial opposite movement of said output means; and means responsive to said movement of said output means to effect torque measurement.

19. A torque sensor as set forth in claim 18, wherein said lost motion connection comprises opposed castellated ends (4, 5) (34, 35) of said input elements interdigitated and dimensioned to effect a lost motion coupling.

20. A torque sensor as set forth in claim 18, said output means (6) comprising radially nested collars (6.1, 6.2) carried by respective input means and integrally secured thereto by said flexible elements.

21. A torque sensor as set forth in claim 18, including a second torque sensor coaxially disposed in series with said first mentioned torque sensor; each said torque sensor having a respective output means and being secured to said torque bar by respective input means with a respective torque measuring means responsive to rotation thereof to effect torque measurement.

22. A torque sensor pair as set forth in claim 21, the output means of said torque sensors comprising a respective collar (12, 13) of differing radii and said collars being nested and secured together; including respective means (29, 30) responsive to shifting of an output collar for measuring torque stress responsive to shifting of the respective output collar, wherein an input means (21, 22) of each torque sensor is carried on a portion (24, 25) of the other input means.

23. A torque sensor set forth in claim 21, wherein respective output means comprises radially secured nested collars; and magnetic means (29, 30) responsive to movement of each output means, including a flux blocking baffle 36 isolating the magnetic fields of said magnetic means from each other.

24. In a torque sensor pair as set forth in claim 21, wherein two output means (26) are integral having output components axially spaced, an input means (31, 32) of each torque sensor having spokes connected to one side of an output means, and spokes connected to a common collar (27) of said input means having spokes connected to respective opposite sides.

25. In a torque sensor as set forth in claim 18, wherein the output means comprises a pair or radially nested collars (6.1, 6.2) secured to each other by laser-welding.

26. In a torque sensor as set forth in claim 18, wherein said input means comprises sleeves on (1, 2) said torque bar having interdigitated castellated ends dimensioned to mesh as a lost motion coupling.

27. In a torque sensor as set forth in claim 26, said input means further comprising collars (8) secured to said sleeves by laser-beam welding.

* * * * *